United States Patent [19]

Bäder et al.

[11] 3,948,867

[45] Apr. 6, 1976

[54] PROCESS FOR POLYMERIZING ACRYLIC ACID WITH INHIBITOR AND RETARDER PRESENT AND THE USE OF RESULTANT POLYACRYLIC ACIDS

[75] Inventors: Erich Bäder, Hanau am Main; Heinz Haschke, Grossauheim, both of Germany

[73] Assignee: Deutsche Gold- und Silber-Scheideanstalt vormals Roessler, Frankfurt am Main, Germany

[22] Filed: Aug. 15, 1974

[21] Appl. No.: 497,645

Related U.S. Application Data

[63] Continuation of Ser. No. 160,161, July 6, 1971, abandoned.

[30] Foreign Application Priority Data

July 3, 1970 Germany............................ 2032953

[52] U.S. Cl. .............. 260/80 M; 210/54; 260/80 P; 260/85.7; 260/86.1 E, 260/88.1 PC
[51] Int. Cl.² ..... C08F 1/82; C08F 1/80; C08F 3/44

[58] Field of Search 260/80 M, 80 P, 85.7, 88.1 PC, 260/86.1 R, 86.1 E

[56] References Cited
UNITED STATES PATENTS

| 2,904,541 | 9/1959 | Barrett.................................. 260/80 |
| 3,493,471 | 2/1970 | Bashaw.................................. 203/8 |

FOREIGN PATENTS OR APPLICATIONS

| 971,055 | 9/1964 | United Kingdom.................. 260/80 |

Primary Examiner—Christopher A. Henderson, Jr.
Attorney, Agent, or Firm—Michael J. Striker

[57] ABSTRACT

Process of manufacturing bead-shaped polymers from acrylic acid by the polymerization of monomeric acrylic acid under slow addition of the monomer to a powerfully stirred, boiling hydrophobic reaction medium and in the presence of a free radical catalyst as well as polymerization regulator and/or cross-linking agents which comprises carrying out the polymerization in the presence of a polymerization inhibitor and/or polymerization retarder.

10 Claims, No Drawings

PROCESS FOR POLYMERIZING ACRYLIC ACID WITH INHIBITOR AND RETARDER PRESENT AND THE USE OF RESULTANT POLYACRYLIC ACIDS

REFERENCE TO RELATED APPLICATION

This application is a continuation of our prior application Ser. No. 160,161, filed July 6, 1971, now abandoned.

This invention relates to a process of manufacturing bead-shaped polymers of acrylic acid by polymerization of monomeric acrylic acid, as well as to the use of the thusly manufactured polyacrylic acid.

Different types of processes for polymerizing monomeric acrylic acid are already known. These can be divided into three groups: bulk polymerization, polymerization in aqueous solution and polymerization in organic solvents.

In carrying out the bulk polymerization of acrylic acid considerable difficulties are encountered in conducting the polymerization at a sufficiently rapid rate because of the heat generated and preventing an explosive type reaction course. This can be accomplished only through very careful dosing of the polymerization catalyst, for example through irradiating with visible or ultraviolet light or with gamma rays. This type of process has for readily understandable reasons been utilized only on a laboratory scale. A technical usable process has been proposed in which a solution of the polymerization catalyst in the monomer is continuously sprayed with a highly heated gas and the polymerization carried out with the monomer and catalyst in this finely distributed form (German patent No. 693,889). Thereby, however, the polymer precipitates out in a very finely divided form or as threads and, because of the short residence time and the existing reaction conditions, polymers are formed which contain not inconsiderable amounts of monomeric material.

If the polymerization is carried out in aqueous solutions, there are obtained more or less viscous solutions which on the one hand, because of their viscosity, are difficult to handle and from which, on the other hand, the pure dry polymeric materials are isolated only with difficulty (German patent No. 942,298 and published accepted German patent application No. 1,218,157). The polymers furthermore even at low working concentrations are at the least partially intra- and intermolecularly cross-linked and further evidence exceptionally high average molecular weights. This can be traced back to the fact that the already formed polymer during the entire reaction course remains dissolved in the reaction medium and is accordingly constantly susceptible to a multiple number of transfer reactions and grafting reactions.

Bead-shaped polymers can be prepared in aqueous systems only by the copolymerization of at the most 50% acrylic acid with water-insoluble comonomers in aqueous electrolyte solutions (German Patent No. 907,827). The thusly formed bead copolymers are, however, substantially insoluble in water.

In the polymerization carried out in organic solvents the formed polyacrylic acid, in contrast, precipitates out of the reaction medium. There are obtained as a result only slightly cross-linked products which, however, have only a very low molecular weight. If the solvent or mixture of solvents used consist of a just very little hydrophilic material, the polymer which precipitates out evidences an enormous tendency to adhere onto the reactor walls and separates out of the reaction medium in the form of a very difficultly separable strongly adhering coating or as clumps which possibly may also be in the swollen state.

By the use of special hydrophobic reaction mediums, this problem arises only to a small degree (U.S. Pat. No. 2,904,541). However, in this case the polymerization must be carried out in very dilute reaction mixtures and with resultingly decreased throughputs while the polymer separates out in exceptionally fine form and resulting in difficultly conveyable suspensions. In certain instances the polymer is also modified in an undesired manner in that a portion of the reaction medium is incorporated into the resulting polymer (German Patent No. 912,755).

Finally, an inverse emulsion polymerization process is known in accordance with which in a water in oil emulsion an aqueous monomer solution in a hydrophobic solvent is introduced and by means of a conventional catalyst brought to polymerization (published accepted German patent application No. 1,089,173). However, in this process there is also recovered a cross-linked water insoluble polyacrylic acid.

It has now been found that bead-shaped polymers of acrylic acid can be obtained by polymerization of monomeric acrylic acid if the monomer is slowly added to a powerfully stirred high boiling hydrophobic reaction medium in the presence of a free radical catalyst as well as possibly a regulator and/or cross-linking agent, and additionally a polymerization inhibitor and/or polymerization retarder.

The carrying out of the polymerization in the absence of any polymerization inhibitor and retarder under otherwise exactly the same conditions, for instance in accordance with U.S. Pat. No. 2,904,541, results in that, instead of a bead-shaped polymer, a very dense finely divided precipitation polymer is obtained which is characterized by the disadvantages associated with this form of polymer.

Independent of the actual temperature of the liquid phase of the reaction mixture, if the reaction medium is not at the boiling point thereof, no or only very little polymerization occurs. The polymerization, however, is initiated when for example the pressure is lowered or if the temperature is increased so that the fluid phase is brought to boiling.

The bead-shaped polyacrylic acid produced in accordance with the invention, and without using cross-linking agents, probably is conditioned by the low polymerization velocity due to the presence of the polymerization inhibitors or retarders in comparison to the known polyacrylic acid manufactured in accordance with the known process in hydrophobic organic solvents, by a higher molecular weight even on the basis of the almost complete impossibility of any cross-linking-reaction after discontinuance of the growth reaction and suspension of the finished polyacrylic acid particles in the inhibitor and/or retarder containing liquid phase are not, or only slightly cross-linked and as a result are of improved water solubility and are more suitable for use as complex formers.

In the process of the invention there can be used only inert hydrophobic systems such as aliphatic or aromatic hydrocarbons or halogenated hydrocarbons or their mixtures as the reaction medium. Even with reduced additions of hydrophilic components, for instance alcohols, there is produced in a high amount undesired polymers which stick to the reactor walls and also stick the originally formed polymer beads so that finally a caked or clumped reaction product is obtained which is difficult to handle.

The choice of suitable reaction medium depends on the reaction temperature selected for the reaction, the reaction having to be carried out at the boiling point of the reaction medium. Instances of suitable reaction media include n-heptane and the systems n-heptane/Decal in (decahydro-n-heptane/xylene, n-heptane/n-hexane or n-heptane/chloroform. Through the addition of a second additional component, the boiling point of the reaction medium can be further adjusted.

For carrying out the bead polymerization reaction, there are principally two different possible methods of proceeding: The reaction is first, under the slow addition of a solution of the polymerization catalyst, the polymerization inhibitor and/or the polymerization retarder in monomeric acrylic acid, preferably diluted with a portion of the reaction medium, introduced into the balance of the reaction medium or the entirety of the reaction medium which is maintained under powerful stirring and boiling under reflux. Thereby it has been found to be advantageous if a part of the polymerization catalyst is already present in the reaction medium in the form of a solution or suspension thereof. There is thereby obtained a product of rather uniform bead size and additionally a rectification by recycling of the reaction medium is generally not necessary, the balance of the polymerization catalyst can be added to the reaction medium at any time. According to this method of proceeding the total amount of monomer and at the least the major amount thereof is changed and the rather troublesome timewise and energy costly destabilization by distillation of the acrylic acid is avoided.

According to the second variation of the process the reaction is carried out by the slow addition of a solution of the total amount of polymerization catalyst and of polymerization retarder in a destabilized monomeric acrylic acid, preferably diluted with a part of reaction medium, to the balance or the total amount of the reaction medium which contains the polymerization inhibitor and which is maintained under powerful stirring and boiling reflux. Thereby the polymerization inhibitor can be added to the reaction medium either directly or in the form of a very concentrated solution thereof in a small amount (at the maximum about 25% of the total amount) of the monomeric acrylic acid. This variation of the process produces precipitation polymers which are crust-free bead polymers.

After completion of the reaction, there can be, according to both variations of the process, easily recovered the polymer from the polymer-bead suspension by the conventional polymer separation procedures, for instance filtering or centrifuging. The polymer is recovered in an easily washable form. The separated filtrate is again usable as reaction medium, it has to be rectified no sooner than after 2 or 3 reusings. The separated bead polymers can be easily dried preferably in vacuum. Thereby, there can be separated and/or recovered any adhering reaction medium.

As polymerization catalysts there can be used all of the known radical forming, hydrophobic catalysts, in particular benzoyl peroxide (the conventional water content of benzoyl peroxide does not interfere), 2,2'-azobis(2-methylpropionitrile, lauroyl peroxide or also the so-called active catalysts such as acetylcyclohexylsulfonyl peroxide. Tertiary butylhydroperoxide is too strongly hydrophilic and is therefore unusable in the process of the invention.

As polymerization inhibitors, there are suitable all of the substances which inhibit radical polymerizations. Such substances are for example hydroquinone or pyrocatechal. As polymerization retarders within the framework of the invention, there are suitable those materials which retard the average kinetic velocity constants of the growth reaction in radical polymerization.

The suitable polymerization retarders for use in combination with the inhibitors or which can be used alone, if of sufficiently great activity, are for instance o-dinitrobenzene, vinylacetate, triphenylmethane compounds such as triphenylchloromethane or hexamethylparafuchsin or also allyl alcohol or $\alpha$-methylstyrene.

If the polymerization retarders are used in combination with the inhibitors which is the preferred manner of carrying out the process of the invention, the polymerization retarder is used in about the same order of concentration as the polymerization catalyst. The concentration of the polymerization inhibitor amounts in most cases roughly to about 10% of the catalyst - concentration or less.

Analogously to the generally known mathematical interrelationship in bead polymerization, there are also to be taken into consideration in the process of the invention the individual factors which together constitute the polymerization conditions, and namely the polymerization temperature, medium, catalysts (type and concentration) as well as the force of stirring, if products of the optimal properties are to be obtained. Additionally, it is important in special cases of the process in accordance with the invention to take into consideration that a corresponding balance between the inhibitor and/or retarder types and concentrations used is observed. In dependence on these parameters, there exists a certain more or less sharply defined range within which bead polymerization is possible. In the border-zones of these ranges the polymer formation is more or less accompanied by the formation of precipitation polymers, outside of these ranges only precipitation polymers are formed which are associated with crust formation and wall sticking or else the polymerization does not take place at all.

Generally, in the process according to the present invention, the catalysts are used in a concentration of 0.05–5 wt.-%, especially 0.1–2 wt.-%, preferably 0.2–1 wt.-%; the polymerization inhibitors are used in a concentration of 0.–0.5 wt.-%, especially 0–0.2 wt.-%, and preferably 0.02–0.2 wt.-% and the polymerization retarders are used in a concentration of 10–0 wt.-%, especially 5–0 wt.%, preferably 1–0.2 wt.-%, calculated on the amount of monomer charged.

Corresponding to the general procedure by which all types of bead polymer are obtained, a powerful stirring of the reaction medium is required for the bead polymer to be formed. On the other hand, the bead size decreases with increasing stirring intensity. This exact effect has been observed with the aforedescribed processes as for example the mean bead diameter of the recovered polymer decreases under substantially similar conditions from a diameter of 3 mm at a stirring velocity of 300 rpm to a diameter of 1 mm at a stirring velocity of 600 rpm.

When too powerful stirring is used or as a result of mechanical influences it is possible that the first formed polymer beads are during their formation or thereafter broken up or thoroughly ground up. As a result the ease of handling is disadvantageously affected, and especially those disadvantages associated with polymer suspensions become apparent. However, there is not associated any other change of the properties of the polymer, as for instance the average molecular weight, the degree of cross-linking, etc., of the polyacrylic acid produced in accordance with the invention. In many cases naturally in connection with its later application, the outer shape of the polyacrylic acid produced in accordance with the invention does not assume any significance. They need not be but if advantageously, they can be for the subsequent uses employed as beads but can, as is understandable, be for instance employed in finely ground form or as solutions. What is decisive, however, is the favorable properties associated with the polymers prepared according to the process of the invention.

The size of the beads can further be influenced by variation of the polymerization temperature, and namely through changing the boiling point of the reaction medium. Specifically, the bead size generally decreases with increasing reaction temperature. It has further been observed that with increasing bead formation temperatures, the beads have become more compact, harder and are not as susceptible to sticking together and adhering to the reactor walls. As the lowest temperature limit for the polymerization, there is to be taken into consideration as is self-understandable, the "starting temperature" for the decomposition reaction of the charged radical catalyst, the temperature at which the beads already are of a gel type, gelatin-like, and adhering to one another. As temperature intervals within which the bead polymer of acrylic acid can be satisfactorily formed, there is in accordance with the invention to be understood the range of about 60° to about 200°C, preferably from about 80° to about 120°C.

As can be understood, it is also possible to influence the habit of the polymers separating out through addition of suitable suspension agents.

Finally, the bead size is also in a similar manner dependent on the relative and absolute concentration of the polymerizationcatalyst and polymerization inhibitor, which are in the ranges already described in general necessary if the polymerization is to take place. With reference to the absolute catalyst concentration, generally smaller beads are obtained with larger amounts of initiator radicals.

In order to obtain beads of the desired size, all of the factors controlling the bead size must be considered together. Thus, there separates out for instance under equal conditions beads of comparable size and quality if the polymerization is carried out at a temperature of 92°C or if the temperature is increased to 110°C and simultaneously the catalyst concentration is reduced by one third. Of course, the decreasing of the catalyst concentration simultaneously results in a certain decrease of the yield and the increase in the temperature results in a certain decrease in the average polymerization degree.

Generally, the polymer separates out in accordance with the invention in the form of beads having an average diameter of 0.5–5 mm, preferably 0.1–3 mm, possibly in addition to secondary amounts of precipitation polymer.

The average molecular weight of the polymer is as is self-understood analogously to the general polymerization kinetics based on certain facts, namely:

The choice of different polymerization catalysts and their concentration, the choice of different polymerization inhibitors and their concentration, the choice of different polymerization retarders and their concentration, the choice of different polymerization temperatures and mediums, the choice of different polymerization regulators or cross-linking agents and the concentration thereof. The process for polymerization of acrylic acid according to the instant invention is explained by the following:

In general, there are obtained, dependent entirely on the type and concentration of the catalyst used, products with different average molecular weights, whereby the effect thereon is essentially regulated by the known relationships, that higher initiating agent concentrations produce products with lower average molecular weights. Actually, the average molecular weight of acrylic acid bead polymer decreases with increasing concentrations of the polymerization catalyst. Correspondingly, the average molecular weight of the product is changed if a catalyst with a certain decomposition velocity at the actual polymerization temperature is substituted by another with a higher decomposition velocity. For example, under the same conditions, the average molecular weight is dependent on the type of catalyst used in accordance with the following series: benzoyl peroxide > lauroyl peroxide > 2,2'-azobis(2-methylpropionitrile.

The dependence of the average molecular weight on the catalyst concentration is also influenced by lower inhibitor concentrations, i.e., it flattens out with increasing amounts of charged inhibitor (according to Table 1).

TABLE 1

Average polymerization degree of bead-shaped polyacrylic acid in dependence on the catalyst and inhibitor concentration at a retarder (vinyl acetate) concentrations of 0.5 wt.-% and a reaction temperature of 98°C.

| Amounts used | | Viscosity- |
|---|---|---|
| hydroquinone wt.-% | benzoyl peroxide wt.-% | -Average polymerization degree P |
| 0.0166 | 0.166 | 2,650 |
| 0.0166 | 0.5 | 1,370 |
| 0.0166 | 1.0 | 760 |
| 0.0166 | 1.5 | 670 |
| 0.033 | 0.166 | 2,300 |
| 0.033 | 0.5 | 1,460 |
| 0.033 | 1.0 | 1,000 |
| 0.033 | 1.5 | 1,000 |
| 0.05 | 0.166 | 2,300 |
| 0.05 | 0.5 | 1,800 |
| 0.05 | 1.0 | 1,500 |
| 0.05 | 1.5 | 1,200 |
| 0.1 | 0.166 | 1,520 |
| 0.1 | 0.5 | 2,100 |
| 0.1 | 1.0 | 980 |
| 0.1 | 1.5 | 850 |

The concentration is given in weight percent calculated on the total weight of the charged monomer = to 100%.

Table 1 shows that increasing catalyst concentration leads to the production of lower molecular weights and this effect is more strongly marked the lower the concentration of the simultaneously present inhibitor. On the other hand the inhibitors also have an effect on the average molecular weight of the polymer. Of course increasing inhibitor activity can be realized by the use of inhibitor of higher capacity as well as by the use of higher inhibitor concentrations, in either, there results an increase in the average molecular weight of the recovered polymers. However, this effect is less marked and a decrease in the molecular weight realized through increasing the catalyst concentration. The increase of both of the concentrations (catalyst and inhibitor) at constant concentration ratios leads to the production of products of decreasing average molecular weight.

If the inhibitor concentrations are especially high relative to the selected catalyst concentration, the average molecular weight of the polymers decreases markedly and the polymerization finally is completely inhibited. Thereby there can be under use of high inhibitor concentrations with increasing catalyst concentrations obtained a maximum of the average polymerization degree (see Table 1).

Similarly the polymerization inhibitors act in conjunction with the polymerization retarders with increasing retarding effect (activity and/or concentration) to increase the average molecular weight of the recovered polymers. For example by the addition of vinyl acetate as retarder in the range of 0 to 1.0 weight % vinyl acetate calculated on the monomer an almost linear increase of the average molecular weight of the recovered polyacrylic acid is realized (see Table 2).

TABLE 2

| Concentration Vinylacetate wt.-% | Average Polymerization degree $\bar{P}$ | Increase factor |
| --- | --- | --- |
| 0.0 | 1 200 | 1.0 |
| 0.5 | 1 800 | 1.5 |
| 1.0 | 2 500 | 2.1 |

The different activities of the individual retarders with respect to the average polymerization degree of the recovered bead shaped polymers can be seen from Table 3 which follows:

TABLE 3

| Retarder | Average Polymerization degree $\bar{P}$ | Increase factor |
| --- | --- | --- |
| without retarder | 1 200 | 1.0 |
| Triphenylchloromethane | 1 500 | 1.25 |
| Hexamethylparafuchsin | 1 750 | 1.46 |
| Vinylacetate | 1 800 | 1.50 |
| Allylalcohol | 1 900 | 1.58 |
| o-Dinitrobenzene | 2 020 | 1.69 |

The retarding activity of the substances set out in Table 3 increases in the order of sequence in which they are named. Differently expressed, in the given sequence the amount of retarder required to produce the same type of bead shaped polymer decreases in the order of the naming of the retarders.

It is of course understood that the activity of many of the retarders, as for example vinyl acetate effects at least partially also a decrease of the growth velocity during the copolymerization reaction.

In accordance with the generally known facts regarding polymerization kinetics, the temperature dependency of the average polymerization degree of the recovered polymer decreases with increasing polymerization temperature, that is also with increasing boiling point of the reaction medium (see Table 4).

TABLE 4

Average polymerization degree of bead shaped polyacrylic acid in dependence on the polymerization temperature at a catalyst (benzoylperoxide) concentration of 0.5 weight %, and inhibitor (hydroquinone) concentration of 0.05 weight % and a retarder (vinylacetate) concentration of 0.5 weight %.

| Polymerization temperature T (°C) | Average Polymerization degree $\bar{P}$ |
| --- | --- |
| 83 | 3 200 |
| 88 | 2 560 |
| 97 | 1 800 |
| 101 | 1 200 |
| 106 | 740 |
| 107 | 720 |

The concentration in weight percent is calculated on the amount of charged monomers= 100%.

As the acrylic acid bead polymerization must always be carried out at the boiling point of the reaction medium, the temperature dependency, if it is assumed that the same pressure is always used, is equal therefore to the influence of the reaction medium on the properties of acrylic acid bead polymers.

Independent of the already described influences on the average molecular weight of the acrylic acid bead polymers are the influences whih are known to take place by the concomitant use of regulators or cross-linking agents.

As regulators there are suitable for the polymerization all substances which may be conventionally used for this purpose in the polymerization of acrylic compounds and especially organic sulfur componds such as mercaptans and thioglycolacidesters.

In the course of carrying out the known processes for polymerizing monomeric acrylic acid, and above all in the polymerization carried out in aqueous solution, there is recovered at least in part a very strongly cross-linked polymer. The particular cross-linking degree depends however in all of these cases in an extremely complex manner on the reaction conditions wherein most of the effects are overlapping so that it is practically impossible to predetermine and arrive at a predetermined cross-linking degree. If the process in accordance with the invention is carried out in the absence of cross-linking agents substantially uncross-linked polymers being obtained. In a very simple manner and by similarly simple techniques, i.e., addition of suitable amounts of known cross-linking agents, products are obtained having a desired predetermined cross-linking degree.

As cross linking agents there can be used all of those compounds conventionally used in the polymerization of acrylic compounds such as two-and polyfunctional vinyl-, allyl-and acrylic compounds, for example divinylbenzene or ethyleneglycoldimethacrylate.

The addition of cross-linking agents which are copolymerized in the reaction influences the total polymerization velocity, the addition of polymerization retarders or accelerators accordingly which are present in the manufacture of the cross-linked polymers also require that the reaction conditions, i.e., temperature, catalyst concentration, retarder and/or inhibitor concentration be correspondingly modified. In addition by the incorporation of the cross-linking agents the properties of the recovered polymers and particularly the solubility or swellability in the reaction medium is changed and therefore with the use of cross-linking agents and the conditions must be regulated as above set out if bead shaped polymers are to be formed. Of course, if the limits are exceeded, relatively highly cross-linked products are obtained. Thus for example, by using divinylbenzene in ethylvinylbenzene solution as a cross-linking agent the copolymerization limits under maintaining of conditions whereby beads will be formed, requires that a maximum of 2 to 3 weight % of divinylbenzene be used. In accordance with the process of the invention in the absence of cross-linking agents there are prepared bead shaped polymers having an average molecular weight of about 10,000 and to about 300,000 which are practically completely uncross-linked, excellently soluble in water, possessed of high Hampshire test values and have good complex building properties and are securely hydroscopic.

They are suitable therefore for incorporation as builders in washing and cleaning agents and additionally as complex formers especially in alkaline mediums or as sedimentation aids.

It was known that with the heretofore manufactured polyacrylic acids that the latter more or less formed complexes with heavy metal ions. These complexes however were either water insoluble or only soluble upon great dilution. The uncross-linked polyacrylic acids prepared in accordance with the invention are in comparison of considerable practical interest since at essentially higher concentrations they form water soluble complexes with metal ions so that it is possible to keep those metal ions in solution even in the presence of precipitation reagents.

In contrast to the conventional polyacrylic acids described for example by T. I. Rabek in ("Polyelektrolyte - Allgemeine Einfuehrung", Akademie-Verlag, Berlin 1967 P. 50), the acrylic acid bead polymers in accordance with the invention form with polyvalent metal ions particularly in alkaline medium, water soluble complexes which are sufficiently stable that in the presence of precipitation reagents such as hydroxyl or carbonate-ions they are maintained in solution. Additionally the free bead polyacrylic acids are of much better water solubility than the acrylic acid polymers produced by the known procedures and are capable of solution in water without any addition of alkali. Under certain conditions, in dependence on the type of complexed metal ions and the concentration of the polyelectrolytes, there come into consideration a distinct pH range in the acid region and only in this region that with the acrylic acid bead polymers are difficultly soluble complexes formed in water, which however by changing the pH value by means of lye or acid addition, it is immaterial if alkali or acid conditions are established but that the critical pH value be avoided again go into solution.

Especially surprising is that the bead polyacrylic acids even in alkaline solution form stable water-soluble complexes with metal ions also if the difficulty soluble hydroxides for instance $Mg(OH)_2$ or $Fe(OH)_3$ are involved, the complexes remaining in solution.

The bead polymer prepared in accordance with the process of the invention in the presence of cross-linking agents, i.e., bead polyacrylic acids having definite predetermined cross-linking degrees swell only more or less strongly with water or alkali under formation of glass beads or gel-like bead suspensions thixotropic gels up until viscous solutions in dependence on the cross-linking degree. They are excellently suitable as thickening agents and as sedimentation aids.

In the following examples the manufacture of uncrossed-linked bead polyacrylic acid and the manufacture of bead polyacrylic acid with a definite degree of cross-linking as well as the use of the thusly manufactured polymer is further illustrated.

Examples 1 to 7 describe the manufacture of uncross-linked polymers.

In these examples the complete-stability-constants are defined as follows:

$$\lg K_{stab}^{Ca^{++}} = \frac{[Ca(PAS)_2]}{[Ca^{++}][(PAS)_2^{--}]} \quad \lg K_{stab}^{Fe^{+++}} \frac{[Fe(PAS)^{++}]}{[Fe^{+++}][(PAS)^-]}$$

wherein $(PAS)^-$ means one equivalent of the polymeric acrylic acid.

EXAMPLE 1

In a 1 liter quick fit wide-mouthed flask provided with a vane stirrer, reflux cooler, thermometer and feed tube there were introduced 300 ml n-heptane. The receiver was under stirring (450 rpm) maintained in a 140°C thermostatted heating bath at the boiling point (b.p. = 98°C) under strong reflux. In this boiling stirred receiver there was within 50 minutes introduced a solution composed of 0.36 g benzoyl peroxide, 36 ml stabilized acrylic acid (0.05% hydroquinone), 24 ml distilled acrylic acid, 0.03 ml distilled vinylacetate and 200 ml n-heptane. After the addition was complete the reaction mixture was stirred for 10 more minutes in the heating bath, filtered off using suction, the recovered bead polymer washed with n-heptane and dried in vacuum at 100°C. There were recovered 58.9 g (93.0% of theory) of a bead polyacrylic acid (average bead diameter about 1 mm) have an average molecular weight $\overline{M} = 79,000$ ($\overline{P} = 1,100$). The product was excellently water soluble and in solution provided substantially no increase in viscosity as compared to pure water; is suitable for use as a complex former: for instance $\lg K_{stab}^{Ca^{++}} = 3.06$ (at a pH = 10.5 and an ion strength I = 0.24 mol l$^{-1}$) $\lg K_{stab}^{Fe^{++}} = 31.0$ (at a pH = 11 and calculated on an ion strength I = 1.0 mol l$^{-1}$) and has strength builder properties on incorporation into a washing agent (Hampshire test value: HT = 780).

The advantage of the products of the invention in comparison to those described in U.S. Pat. No. 2,904,541 which represents the state of the art can be seen from the following comparison example:

Comparison Example:

In a 1 liter wide-necked right angle flask equipped with a reflux cooler, vane stirrer (400 rpm) and a feed tube there was introduced a solution of 0.15 g benzoyl peroxide in 15 ml distilled acrylic acid and 0.05% benzoyl peroxide, under stirring, said flask being maintained in a thermostatted heating bath at 120°C and maintained under reflux. After visible formation of polymer, there was introduced a solution composed of 0.6 g benzoyl peroxide in 25 ml distilled acrylic acid + 225 ml benzene. The addition of this mixture was continued over a 6 hour period corresponding to an addition velocity of about 14% of the total volume per hour. These experimental conditions correspond essentially to the conditions described in the Example of U.S. Pat. No. 2,904,541 differing only in that ½ of the acrylic acid concentration is in the addition mixture and therefore an about double addition velocity was used (also with an about equal acrylic acid addition amount per unit of time). Therefore it was possible to withdraw continuously from the reaction mixture the polymer after half of the time set out in the Example of the noted patent so that the process of the patent and of the invention would be more truly comparable and any disadvantages arising from the building up of the polymer in very thick finely divided form with the simultaneous decrease of the boiling delay by the reduced monomer addition is lowered. On the other hand the reaction time as well as the recycling of the solvent which has a disadvantage use effect on the material is reduced. During this mode of action there forms on the flask wall a very thick crusty polymer which at the reactions end is so solidly adhered to the flask wall that it cannot be removed without destroying the flask. In addition the polymer precipitates out in a very thick finely divided form so that the stirring is interfered with and the polymer entraps liquid reaction phase. For this reason, i.e., the consistency, the polymer is not readily washable and adheres after the separation for instance through filtration of the dispersion agent (benzene) in the form of solid clumps which following drying give finely divided (particle size less than 1 $\mu$) dust-formed materials. The reaction was carried out using instead of benzene, n-heptane as taught by the applicants and the disadvantage effect of crust formation and adhering to the reaction vessel wall was slightly supressed, the polymer however had the same properties as already described. In both cases the addition per time and volume unit (1.7 g $h^{-1} l^{-1}$) is essentially lower than in the process in accordance with the invention (averaging 90 g $h^{-1} l^{-1}$).

EXAMPLE 2

Receiver: 300 ml n-Heptane under stirring (300 rpm) under strong reflux (in a heating bath controlled by a thermostat at 130°C, b.p. = 98°C).

Feed : Solution of 0.3 g benzoylperoxide + 0.02 g hydroquinone in 60 ml acrylic acid (distilled) + 200 ml n-heptane + 0.3 ml vinylacetate (distilled) within about an hour.

After the addition had been completed, the reaction mixture was washed onto a suction filter, subjected to suction, washed with n-heptane, dried in vacuum at 100°C. There was recovered a practically precipitation polymer - free acrylic acid bead polymer (bead diameter about 1.5 mm), $\overline{M} = 104,500$ ($\overline{P} = 1,460$) in a yield of 86.5% of theory. The product was excellently water soluble (especially on warming) and had the usual complex former or builder properties.

EXAMPLE 3

Receiver: 300 ml n-heptane, containing in suspension 0.1 g benzoylperoxide under stirring (vane stirrer: 300 rpm) at strong reflux (heating bath thermostatted at 130°C).

Feed: Solution of 0.2 g benzoyl peroxide in 60 ml acrylic acid - stabilized (0.05% hydroquinone) + 0.3 g o-dinitrobenzene + 200 ml n-heptane within 50 minutes. Following the addition, conventional working up was carried out.

There was recovered a pure bead polymer (average bead diameter about 1 mm) in a yield of 69.6% of theory, having a $\overline{M} = 146,000$ ($\overline{P} = 2,020$), excellent water solubility and the usual complex former and builder properties.

EXAMPLE 4

Receiver: 300 ml n-heptane under stirring (vane stirrer 300 rpm) and strong reflux (thermostatted heating bath at 130°C).

Feed: Solution of 0.3 g benzoylperoxide in 60 ml acrylic acid - stabilized (0.05% hydroquinone) + 0.3 ml allylalcohol distilled + 200 ml n-heptane within about 50 minutes.

After the feeding was completed, the mixture was stirred another 10 minutes then washed onto a suction filter, and worked up in the usual manner. There was recovered, in a yield of 62.5% of theory, a pure bead polymer (average bead diameter $d=2$ mm) having a $\overline{M} = 158,000$ ($\overline{P} = 2,200$), excellent water solubility and the usual complex former and builder properties

EXAMPLE 5

Receiver: 300 ml n-heptane under stirring (vane stirrer = 300 rpm) under strong reflux (thermostatted heating bath at 130°C).

Feed: Solution of 0.3 g benzoyl peroxide in 60 ml acrylic acid - stabilized (0.05% hydroquinone) + 0.3 g vinylacetate distilled in 200 ml n-heptane within 50 minutes.

After the introduction of the feed was completed, the reaction mixture was washed into a suction filter and further worked up in the conventional manner. There was obtained in a yield of 63% of theory a bead polymer (bead diameter — about 3–4 mm) with the usual solubility, complex former and builder properties. The product had an average molecular weight of 200,000 ($\overline{P} = 2,780$).

EXAMPLE 6a

Receiver: 300 ml n-heptane under stirring (400 rpm vane stirrer) under strong reflux (thermostatted heating bath at 130°C).

Feed : Solution of 0.3 g benzoylperoxide in 60 ml acrylic acid - stabilized (0.05% hydroquinone) + 0.3 ml vinylacetate distilled + 200 ml n-heptane within an hour.

After the usual working up, there was recovered in an about 60% yield (of theory) a bead polymer having an average bead diameter of about 3 mm, an average molecular weight $\overline{M} = 155,000$ ($\overline{P} = 2,150$) and the usual solubility, complex former and builder properties.

EXAMPLE 6b

The process of Example 6a was repeated but there was used the combined filtrates and washing liquids from Example 6a instead of pure heptane. There was recovered in an 86.5% yield (of theory) a bead polymer having an average bead diameter of about 2 mm, the same average molecular weight and the same properties as the polymer of Example 6a.

EXAMPLE 6c

The process of Example 6a was repeated but under use of the combined filtrates and washing liquids of Example 6b in place of pure n-heptane. There was recovered in a 91.5% yield (of theory) a bead polymer having an average bead diameter of about 0.1 mm, an average molecular weight $\overline{M} = 140,000$ ($\overline{P} = 1,950$) and the same solubility, complex former and builder properties.

The determination of the non-volatile components in the filtrate of Example 6c showed:

About 0.11% no-volatile components; 18% of polyacrylic acid (probably formed from residual monomers during the evaporation of the volatile components), 80% benzoyl peroxide and about 2% hydroquinone. This finding clarifies the increase of the bead size and of the average polymerization degree of the products where unrectified reaction medium is recycled into the process.

EXAMPLE 6d

The procedure of Example 6a was repeated but using redistilled combined filtrates and washing liquids from Example 6c instead of pure n-heptane. There was recovered in a 60% yield (of theory) a bead polymer having an average bead diameter of about 2 mm and the usual product properties.

EXAMPLE 7

30 ml n-heptane under stirring (vane stirrer, 300 rpm) under strong reflux (thermostatted heating bath at 140°C) shortly before the beginning of the monomer addition — 10 ml 0.2% hydroquinone solution in acrylic acid-sprayed.

Feed : Solution of 0.3 g benzoylperoxide in 50 ml distilled acrylic acid + 0.3 ml vinylacetate distilled + 200 ml n-heptane, within 2 minutes.

Following the introduction of the feed, the reaction mixture stirred a further 10 minutes, then washed onto a suction filter, suctioned off, washed with redistilled n-heptane and dried in vacuum at 100°C. There were recovered in a 74% yield (of theory) an acrylic acid bead polymer average (bead diameter 2–3 mm) having $\overline{M} = 146,000$ ($\overline{P} = 2,020$) and the conventional solubility, complex former and builder properties.

Examples 8 to 13 illustrate the preparation of bead polyacrylic acid having definite cross-linking degrees.

EXAMPLE 8

An addition corresponding to 0.5 weight % divinyl benzene, i.e., 0.28 mol % cross-linking agent a maximum of a 6.6 fold average molecular weight increase, relative to the corresponding addition without the cross-linking agent (to be produced).

Receiver: 300 ml n-heptane containing in suspension 0.06 g benzoylperoxide under stirring (stirrer 300 rpm) under strong reflux (thermostatted heating bath at 130°C, b.p. = 98°C).

Feed : a solution of 0.14 g benzoylperoxide in 60 ml acrylic acid - stabilized (0.05% hydroquinone) + 200 ml n-heptane + 0.6 mm divinyl benzene sulution (55% in ethylvinylbenzene) distilled + 0.3 ml vinylacetate, within about 50 minutes.

After the conventional working up there was obtained in a 40% yield of theory a pure bead polymer (average bead diameter about 5 mm).

The product was only slightly soluble in cold water and in cold alkali (within about 12 hours the first smalling of the beads took place) dissolves very rapidly and completely in boiling water or in hot lye. The solutions are noticeably viscous.

EXAMPLE 9

An addition corresponding to 0.5 weight % divinyl benzene, i.e., 0.28 mol % cross-linking agent to provide a maximum 6.6 fold increase in the average molecular weight (relative to the corresponding addition without cross-linking agent).

Reactor: A mixture of 200 ml n-heptane + 100 ml decalin containing in suspension 0.06 g benzoylperoxide under stirring (vane stirrer, 300 rpm) under strong reflux (thermostatted heating bath at 140°C b.p. = 110°c).

Feed : A solution of 0.14 g benzoylperoxide in 60 ml acrylic acid - stabilized (0.05% hydroquinone) + 134 ml n-heptane + 66 ml decalin + 0.6 ml divinylbenzene solution (55% in ethylvinylbenzene) distilled + 0.3 ml allylalcohol distilled within about 50 minutes.

Following the addition the mixture was stirred for another 10 minutes and washed into a suction filter, suctioned off, washed with n-heptane-decalin (redistilled) and dried in vacuum at 100°C. There was recovered in an 87% yield (of theory) a polymer having an average bead diameter of about 1 mm. The product had the same solution and swelling properties as that product described in Example 8.

EXAMPLE 10

An addition comprising 1.0 weight % vinylbenzene, i.e., 0.56 mol % cross-linking agent, to permit a 12.2 fold increase in the average molecular weight (relative to a corresponding addition without the cross-linking agent).

Receiver: A mixture of 200 ml n-heptane + 100 ml decalin containing in suspension 0.06 g benzoylperoxide under stirring (vane stirrer, 300 rpm) at strong reflux (thermostatted heating bath at 140°C, b.p. = 110°C).

Feed : A solution of 0.14 g benzolyperoxide in 60 ml acrylic acid - stabilized (0.05% hydroquinone) + 134 ml n-heptane + 68 ml decalin + 0.03 ml vinyl acetate distilled + 1.2 ml divinylbenzene solution (55% in ethylvinylbenzene) distilled + 0.3 ml vinylacetate distilled within about 35 munites. After the addition was complete, the reaction mixture was stirred for an additional 5 minutes and worked up in the usual manner.

There was recovered in a 72% yield (of theory) a pure bead polymer having an average bead diameter of about 1 mm. The product swelled very slowly in cold water, in hot water swelling of the beads took place, however, no solution, in hot lye the product formed a very viscous solution.

EXAMPLE 11

An addition corresponding to 1.0 weight % divinylbenzene i.e., 0.56 mol % croos-linking agent to provide a 12.2 fold increase in the molecular weight (relative to a corresponding addition without the cross-linking agent).

Receiver: A mixture of 200 ml n-heptane + 100 ml decalin under stirring (vane stirrer, 300 rpm) under strong reflux (thermostatted heating bath at 110°C, b.p. = 110°C) containing in suspension 0.1 g benzoylperoxide.

Feed : Solution of 0.2 g benzoylperoxide in 60 ml acrylic acid - stabilized (0.05% hydroquinone) + 134 ml n-heptane + 66 ml decalin + 0.3 ml vinylacetate distilled + 1.2 ml divinylbenzene solution (55% in ethylvinylbenzene) distilled within about 50 minutes.

Following the conventional working up there was obtained in an 84% yield (of theory) a pure bead polymer (average bead diameter about 1.0 to 1.5 mm). The product had the same solubility and swelling properties as the product of Example 10.

EXAMPLE 12

The addition corresponding to 2.0 weight % divinylbenzene, i.e., 1.12 mol % cross-linking agent to provide at the maximum a 23.4 fold increased average molecular weight (relative to a corresponding addition without the cross-linking agent).

Receiver: Mixture of 200 ml n-heptane + 100 ml decalin under stirring (vane stirrer, 300 rpm) under strong refluxing (thermostatted heating bath: 140°C. b.p. = 110°C).

Feed : Solution of 0.1 g benzoylperoxide in 60 ml acrylic acid - stabilized (0.05% hydroquinone) + 134 ml n-heptane + 66 ml decalin + 2.4 ml divinylbenzene solution (55% in ethylvinylbenzene) distilled + 0.3 ml vinylacetate distilled, within one hour.

After the addition was completed, the mixture was stirred for an additional 5 minutes and worked up in the usual manner. There was recovered in a 54% yield (of theory) a very pure bead polymer (average bead diameter of about 0.5 mm). The product swelled only very slowly in cold water and in cold alkali, it swelled rapidly to form large beads in hot water and formed in hot lye a thick opaque gel.

EXAMPLE 13

The addition comprised 2% ethylene-glycoldimethylacrylate.

Receiver: 300 ml m-heptane under stirring (vane stirrer, 450 rpm) under strong reflux (thermostatted bath at 135°C).

Feed : Solution of 0.3 g benzoylperoxide in 60 ml acrylic acid - stabilized (0.05% hydroquinone) + 200 ml n-heptane + 0.3 ml vinylacetate + 1.2 ml ethylene-glycoldimethylacrylate within 50 minutes.

Following the end of the addition, the reaction mixture was stirred for 30 minutes under reflux and then worked up in the conventional manner. The product was only limitedly soluble in cold and hot water and in cold and hot 1 N NaOH only limitedly swellable.

The following Example 14 together with Table 5 shows the suitability of an uncross-linked bead polyacrylic acid as a complex former for metal ions:

EXAMPLE 14

There were introduced into a 100 ml Erlmeyer flask 200 ml 0.1 n bead polyacrylic acid solution ($\bar{P}$ = 2,410), This was adjusted with 14.0 ml 0.1 N NaOH to a pH of 7.0 and then diluted with 6.0 ml distilled water. Under magnetic stirring 5 ml 0.1 N metal salt solution was introduced and the stirring continued until the precipitate which occasionally formed was again dissolved. There were then introduced 10 ml of 0.1 m solution of a precipitation reagent and it was observed whether precipitation set in. In a parallel blend experiment, without bead polyacrylate and without addition of alkali (instead the same volume of distilled water was used) the precipitation of uncomplexed metal ions under these experimental conditions was followed:

Table 5

| Metal ions | Absence of precipitability with |
|---|---|
| $Mg^{++}$ | $OH^-$, $CO_3^{--}$ |
| $Ca^{++}$ | $CO_3^{--}$ |
| $Ba^{++}$ | $Ox^{--}$*, $CO_3^{--}$ |
| $Tl^+$ | $BrO_3^-$ |
| $Pb^{++}$ in alkaline solution | $SO_4^{--}$, $CO_3^{--}$ |
| $Cu^{++}$ | $CO_3^{--}$, $OH^-$ |
| $Ag^+$ | $CO_3^{--}$ |
| $Zn^{++}$ (0.05 m $ZnSO_4$) | $CO_3^{--}$, $PO_4^{---}$, $OH^-$ |
| $Cd^{++}$ | $CO_3^{--}$, $OX^{--}$, $OH^-$ |
| $La^{+++}$ (0.02 m $La(NO_3)_3$) | $Ox^{--}$, $CO_3^{--}$, $OH^-$ |
| $Zr^{++}$ in alkaline solution | $PO_3^{---}$ |
| $Cr^{+++}$ | $PO_4^{---}$ |
| $Mn^{++}$ | $CO_3^{--}$, $OH^-$, $PO_4^{---}$ |
| $Co^{+++}$ | $OH^-$, $CO_3^{--}$, $PO_4^{---}$ |
| $Ni^{++}$ | $OH^-$, $CO_3^{--}$, $PO_4^{---}$ |

*designates the oxalate ion.

designates the oxalate ion.

Additionally the complex stability constants of the complexes with $Ca^{++}$ and $Fe^{++}$ were determined:

1 g $K_{0.24}{}^{Ca^{++}}$ = 2.21 (measured at a pH = 10.5 and an ion strength I = 0.24 mol l$^{-1}$).

1 g $K_1 Fe^{++}$ = 31.1 (measured at a pH = 11, calculated on an ion strength I = 1.0 mol l$^{-1}$).

The Hampshire test value for the product was HT = 705.

The next example illustrates the thickness effect of cross-linked bead polyacrylic acid.

EXAMPLE 15

An only slight cross-linked bead polyacrylic acid (0.07 mol % cross-linking agent; ethyleneglycoldimethyacrylate) swelled very quickly in water (especially on warming) and effects already in 1% aqueous solution a viscosity of about 1.54 cp (in contrast to water 0.797 cp, measured at 30°C).

A more strongly cross-linked bead polyacrylic acid (0.7 mol % cross-linking agent; ethylene glycoldimethylacrylate) swelled in water to form large ball shaped gel particles and dissolved on heating to form a thick, opaque solution which at a 1% content of bead polyacrylic acid already had a viscosity of about 6.9 cp; a 1% aqueous solution of Na - salt of this polyacrylic acid under the same conditions had a viscosity of about 49.4 cp.

The last example illustrates the use of different highly cross-linked bead polyacrylic acids as sedimentation aids.

EXAMPLE 16

Using a 20% polyacrolein-emulsion as wash water in two parallel experiments, the properties of two differently strongly cross-linked bead polyacrylic acid types were evaluated as sedimentation aids with a polyacrolein-gel dispersion (prepared according to published accepted, German patent application No. 1,229,045).

The procedure followed was analogous to that described in published accepted German patent application No. 1,229,045, to each 100 ml emulsion, 10 ml 0.1 N $FeCl_3$ solution, as well as 10 ml % sedimentation aid solution (SHM) were added. The mixture was thoroughly shaken and then allowed to stand quietly. As a measure for the SHM activity, the relative sedimentation volume (=volume which after the time $t$ has separated as a phase, in percent of the total volume) after 4 hours:

| | |
|---|---|
| weakly cross-linked bead polyacrylic acid | 45 % |
| strongly cross-linked bead polyacrylic acid | 33 % |
| polyacrolein-gel dispersion | 96 % |

It is recognized that the strongly cross-linked polyacrylic acid had the biggest separation and is in this series the best sedimentation aid. The choice of the sedimentation time was chosen so that comparison experiment with the polyacrolein-gel dispersion would have a measurable SHM effect, although the given sedimentation volumes for the two polyacrylic acid samples was already reached after 30 to 60 minutes.

We claim:

1. A process for the production of a polyacrylic acid in the form of small beads consisting predominantly of beads having an average diameter between 0.05 and 5 millimeters by the polymerization of monomeric acrylic acid in a vigorously stirred liquid hydrophobic reaction medium that is maintained at its boiling point in the presence of (a) a free-radical hydrophobic polymerization catalyst in an amount equivalent to between 0.05 and 5% by weight of the acrylic acid, (b) a polymerization inhibitor in an amount equivalent to between 0.02 and 0.2% by weight of the acrylic acid, and (c) a polymerization retarder in an amount equivalent to between 0.2 and 1.0% by weight of the acrylic acid, the said polymerization being effected by slowly adding to the vigorously stirred liquid hydrophobic reaction medium that is maintained at its boiling point, a solution in the liquid hydrophobic reaction medium of the monomeric acrylic acid, the said solution of monomeric acrylic acid including the free-radical catalyst (a), the polymerization inhibitor (b), and the polymerization retarder (c), or by slowly adding, to the vigorously stirred liquid hydrophobic reaction mixture containing the polymerization inhibitor (b), a solution in the liquid hydrophobic reaction medium of a stabilizer-free monomeric acrylic acid containing the free-radical polymerization catalyst (a) and the polymerization retarder (c), and subsequently recovering the resulting small beads of polyacrylic acid from the reaction medium.

2. A process as defined in claim 1 in which the monomeric acrylic acid, the free-radical polymerization catalyst (a), the polymerization inhibitor (b), and the polymerization retarder (c) are added to the vigorously stirred boiling hydrophobic reaction mixture in the form of a solution in the hydrophobic reaction medium.

3. A process as defined in claim 1 in which the vigorously stirred boiling liquid hydrophobic reaction mixture initially contains at most one-third of the amount of the free-radical polymerization catalyst (a) that is to be added for polymerization of all the monomeric acrylic acid that is to be polymerized in the reaction medium in that operation of the process, and the remainder of the polymerization catalyst (a) is added in the form of a solution in the acrylic acid monomer.

4. A process as defined in claim 1 in which the free-radical polymerization catalyst (a) is present in an amount between 0.1 and 2.0% by weight of the monomeric acrylic acid.

5. A process as defined in claim 1 in which the free-radical polymerization catalyst (a) is present in an amount between 0.2 and 1.0 % by weight of the monomeric acrylic acid.

6. A process as defined in claim 1 in which the hydrophobic reaction medium is n-heptane or a mixture of n-heptane with decahydronaphthalene, xylene, n-hexane or chloroform.

7. A process as defined in claim 1 in which the free-radical polymerization catalyst (a) is benzoyl peroxide, 2,2'-azobis(2-methylpropionitrile), lauroyl peroxide, or acetylcyclohexylsulfonyl peroxide.

8. A process as defined in claim 1 in which the polymerization inhibitor (b) is hydroquinone or pyrocatechol.

9. A process as defined in claim 1 in which the polymerization retarder (c) is o-dinitrobenzene, vinyl acetate, triphenylchloromethane, hexamethylparafuchsin, allyl alcohol or $\alpha$-methylstyrene.

10. A process as defined in claim 1 for the production of a polyacrylic acid in the form of beads having an average diameter of 1.5 millimeters which comprises slowly adding to a vigorously stirred body of n-heptane mantained at its boiling point a solution of acrylic acid in n-heptane containing 0.005 gram of benzoyl peroxide as a free-radical polymerization catalyst (a), 0.0003 gram of hydroquinone as a polymerization inhibitor (b), and 0.005 milliliter of vinyl acetate as a polymerization retarder (c) for each milliliter of acrylic acid in the solution, and recovering the polyacrylic acid beads thus formed.

* * * * *